Jan. 31, 1956 J. BRECKMAN 2,733,432

ENCODING CIRCUIT

Filed Dec. 31, 1953 2 Sheets-Sheet 1

INVENTOR,
JACK BRECKMAN.

BY Harry M. Saragovitz
ATTORNEY

ENCODING CIRCUIT

Filed Dec. 31, 1953

2 Sheets-Sheet 2

INVENTOR,
JACK BRECKMAN.
BY Harry M. Saragovitz
ATTORNEY

United States Patent Office 2,733,432

Patented Jan. 31, 1956

2,733,432

ENCODING CIRCUIT

Jack Breckman, Long Branch, N. J., assignor to the United States of America as represented by the Secretary of the Army Application December 31, 1953, Serial No. 401,738

7 Claims. (Cl. 340—347)

Figure 1:
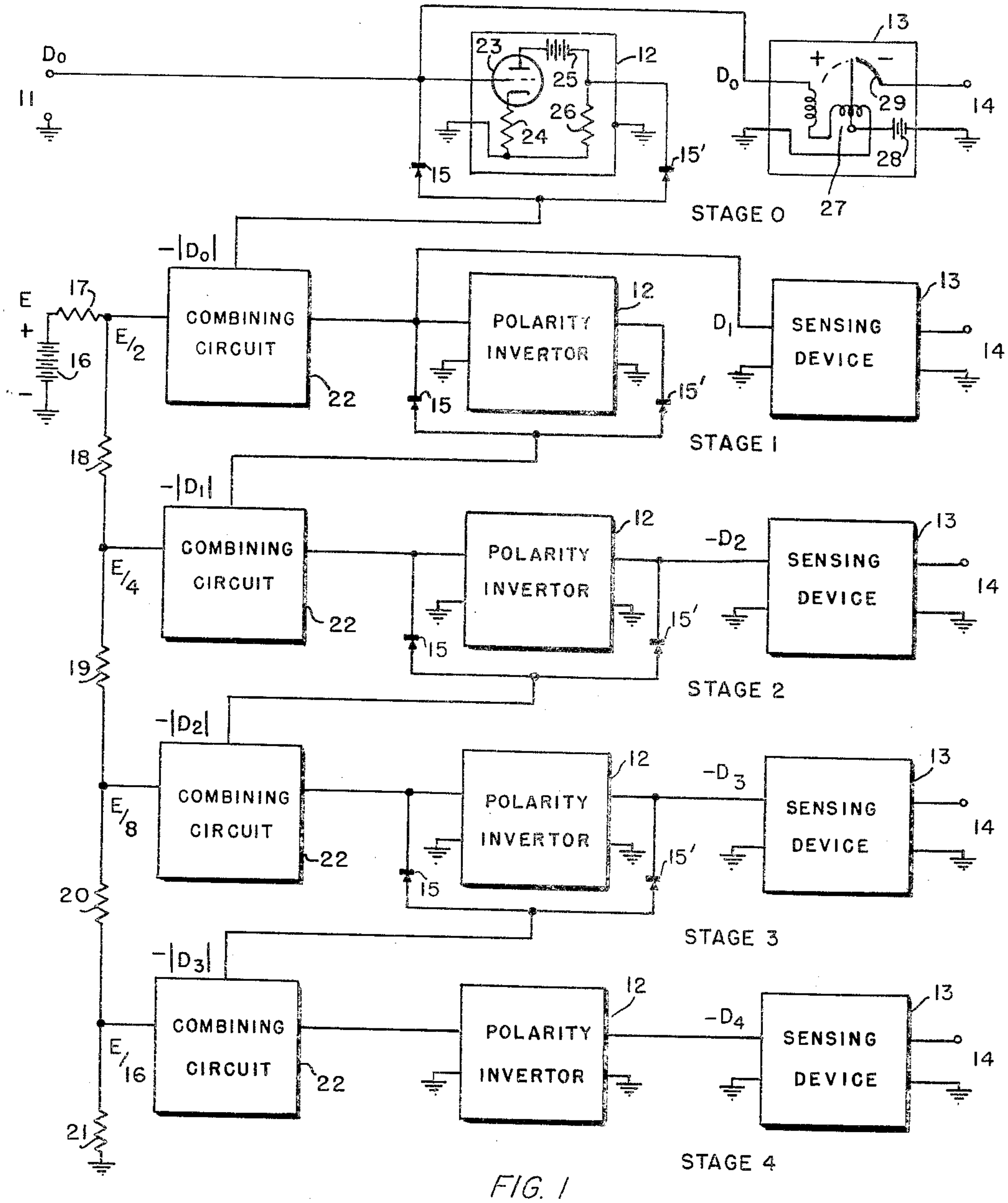

(Granted under Title 35, U. S. Code (1952), sec. 266)

The invention described herein may be manufactured and used by or for the Government for governmental purposes, without the payment of any royalty thereon.

This invention relates in general to devices for encoding a signal amplitude as a code group of digit signals in binary code.

More particularly, the invention relates to a circuit for encoding analogue or signal amplitudes as code groups of signals in cyclic binary code.

Cyclic binary code, which is also known under the names reflected binary code and Gray code, is a well known form of binary code having as its principal characteristic the property that no two successive numbers differ by more than one digit. This property is primarily of advantage in the operation of encoding a signal amplitude by means of so called reading type encoders for the reason that a slight error in the location of the reading element will produce a code group of digit signals representing only the next higher or next lower number and not result in digit signals which represent a grossly different number as sometimes occurs when encoding directly in standard binary code. An example of a reading type encoder is shown, for example, in U. S. application Serial Number 219,103, filed on April 30, 1951, in the names of Bernard Lippel and Joseph A. Buegler and assigned to the present assignee, the Government of the United States.

The theory of standard binary and cyclic binary codes and their relation is explained in the above mentioned patent application of Lippel et al. and is also explained in the patent to R. L. Carbrey #2,538,615.

Digital encoders which are not of the reading type are also well known in the art and are sometimes referred to as weighing type encoders. Generally they consist of electronic circuit arrangements whereby an input signal amplitude is applied and a plurality of digital output signals are produced. Ordinarily the weighing type of encoder is comprised of a plurality of circuit elements which in turn compare an input signal amplitude with a reference amplitude and if the input amplitude is greater than the reference, the difference is passed to a following circuit. If, however, the input signal is less than the reference then the signal itself is passed to a following circuit. These arrangements are suitable for encoding an input signal in standard binary code and are operable when the code groups of signals are comprised of a limited number of digits. An example of such an encoding arrangement is shown in the patent to A. C. Norwine #2,453,454. It will be seen by reference to the Norwine patent, which is typical, that several stages are employed each of which produces a digit signal output and also functions to provide a control voltage for application to the preceding stages. It is this requirement of interconnecting controls between the several stages that makes the organization of such a circuit critical both in design and operation and unsuitable for producing an encoded group of digit signals where the number of digits of the group is large, say of the order of 10 to 15 digits.

In the system of the present invention it has been found that an analogue signal input can be directly encoded in cyclic binary code by a weighing system wherein the signal is compared with a reference potential in successive stages and wherein no control voltages from one stage to another are required. Accordingly, with the system of the present invention, an input signal can reliably be encoded as a group of digit signals, each group having a large number of digits. This appears to be a property of encoding in cyclic binary code which, while not that referred to as the advantage of cyclic code when a reading type encoder is employed, nevertheless has advantages which make it desirable and more advantageous than attempting to encode directly in standard binary code.

Accordingly it is an object of the present invention to provide an arrangement for encoding analogue amplitudes as digit signals in cyclic binary code by means of an electronic circuit arrangement which directly produces the digit signals in a manner which avoids many of the disadvantages and limitations of prior art arrangements.

It is an additional object of the present invention to provide an electric circuit arrangement for encoding an input signal amplitude as digit signals in cyclic binary code without the employment of switching or reading elements.

It is a further object of the present invention to provide an electrical circuit for encoding a signal amplitude as a code group of signals in cyclic binary code which is substantially instantaneous in operation and which directly produces the plurality of digit signals by employing ordinary and inexpensive elements and which involves no mechanical moving parts.

In accordance with the present invention a circuit for encoding a signal amplitude as a code group of digit signals in cyclic binary code comprises an initial or zero stage and a plurality of following stages, 1 to $n$, which in order correspond to decreasingly significant digits of the group. Each of the stages, except the $n$th stage, comprises an absolute value circuit having means for receiving an input amplitude and for producing an output of equal amplitude in a chosen polarity. A source of reference amplitudes is provided. Also provided are means for applying a signal amplitude to the initial stage and means for applying to each stage, 1 to $n$, the difference between the reference amplitude and the absolute value of the output amplitude of the preceding stage, wherein the reference amplitudes have values such that the input amplitude to any stage, $r$, is $D_r$ as defined by the equation $D_r = E/2^r - |D_{r-1}|$, where E is the maximum codeable signal amplitude and $|D_{r-1}|$ is the absolute value of output amplitude of the preceding stage. Also provided are a sensing circuit for each stage and means for coupling each sensing circuit to its stage to produce a digit signal output in accordance with the polarity of input amplitude to the stage.

For a better understanding of the present invention, together with other and further objects thereof, reference is had to the following description taken in connection with the accompanying drawings, and its scope will be pointed out in the appended claims.

Figure 4:
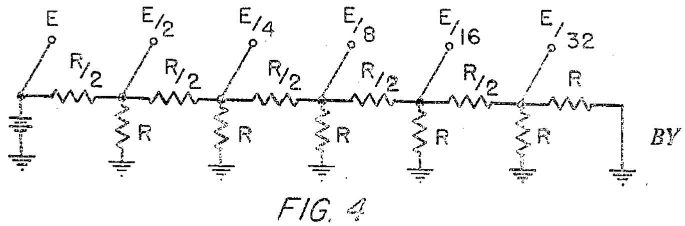

In the accompanying drawings: Fig. 1 is a circuit diagram partly in block and partly schematic, which illustrates a circuit for encoding in accordance with the present invention; Figs. 2A, 2B, 2C, 2D and 2E are a series of related diagrams for use in describing the operation of successive stages of the circuit of Fig. 1; Fig. 3 is a circuit diagram, also partly in block and partly schematic, which illustrates a preferred arrangement of the circuit of the present invention, and Fig. 4 is a circuit diagram for explaining in part the organization and operation of Fig. 3.

Referring now to Fig. 1, there is shown a circuit for encoding a signal amplitude as a code group of digit signals comprising an initial stage 0 and a plurality of five following stages labeled 1, 2, 3 and 4 in an arrangement which is suitable for encoding an input signal amplitude as a code group of five digit signals in cyclic binary code. The initial stage 0 produces the coarsest or most significant digit and here is employed to indicate a positive or negative amplitude. The stages 1 to 4, produce the digit signals which represent the magnitude of the input signal in cyclic binary code. All of the stages, except stage 4, are comprised of an absolute circuit and a sensing output circuit. The input signal amplitude which is to be encoded is here assumed to be a voltage $D_0$ of either positive or negative polarity and is applied at the input terminals 11, which terminals connect to the input of a polarity reversing amplifier 12. The polarity reversing amplifier is here illustrated within the block 12 as a very simple form of electron tube amplifier comprised of a triode 23 having a source of operating potential 25, output load resistor 26 and a cathode bias and degenerative resistor 24. The organization and choice of parameters for this circuit is here assumed to be such that the input voltage applied between grid and ground of the amplifier is reproduced in equal amplitude but in opposite polarity across the output resistor 26.

A sensing device 13 is connected to the input of amplifier 12 and here is illustrated in a very simple form as consisting of a voltmeter having actuating elements 27. The voltmeter indicator is shown arranged to function as a switch so that for any input voltage which is of positive polarity the switch is open, but for any input voltage which is of negative polarity the switch is closed. The switch closes through the element 29 to connect a source of potential 28 to output terminals 14. It will be clear that an input voltage $D_0$ thus produces an output potential, here considered to be a digit signal 1, when the input is of negative polarity but produces no output potential, here considered to be a digit signal 0, where the input is of positive polarity. Accordingly the digit signal output of stage 0 serves only to indicate polarity of the input signal.

The input and the output of amplifier 12 of stage 0 are each connected to one of the two similar rectifiers 15 and 15'. The outputs of the rectifiers are connected together and applied to the input of stage 1 as presently to be described. The conventional representation of rectifiers 15 and 15' indicates that they are so connected that if the input signal is negative it is passed to the following stage by rectifier 15. If however the input is positive no signal is passed by rectifier 15 but instead the output of amplifier 12, which is then negative is passed by the rectifier 15'. It will be clear, therefore, that since amplifier 12 has unity gain, any input voltage applied at terminals 11 is passed to the following stage as a voltage of equal amplitude but in a chosen polarity here illustrated to be negative.

The unity gain amplifier 12 and the pair of rectifiers 15 and 15' as here organized is termed an absolute value circuit since, irrespective of polarity of input voltage, the output is equal in magnitude to the input but of a chosen polarity. Stages 1, 2 and 3 are identical with stage 0 in that each is comprised of the polarity inverting stage 12 with output rectifiers 15 and 15' and coupled to the input of each is a sensing device 13 for producing an output digit signal in accordance with the polarity of the input amplitude to the stage. The *n*th or 4th stage is likewise similar to stages 0, 1, 2 and 3 except that the crystal rectifiers 15 and 15', are omitted since there is no following stage which need be supplied.

To stages 1 to 4 reference voltages are supplied from a source of D. C. potential comprising a battery 16 having a voltage of value E. A series of resistors 17, 18, 19, 20 and 21 connected across battery 16 serves to supply reference voltages of values E/2, E/4, E/8 and E/16 for each of the stages 1, 2, 3 and 4 respectively. The output of stage 0 and the reference voltage E/2 are supplied to a combining circuit shown as a block 22 and the output of 22 is supplied to the input of polarity inverter 12 of stage 1. In similar manner the reference voltage E/4 and the output of stage 1 are supplied to inputs of a combining circuit 22 in stage 2 and the output of 22 is supplied as before to a polarity inverter 12. The same is true for the following stage 3 where the reference input voltage is, as labeled, E/8 and again for stage 4 where the reference input amplitude is E/16.

From the description so far given it will be noted that the reference voltages have each here been chosen as positive voltages relative to ground and that the voltages from the absolute value circuits of the preceding stage in each case are negative. It follows, therefore, that the voltage applied to the input of any stage, 1 to $n$, is the difference of the reference voltage and the voltage supplied by the preceding stage. As will be explained more fully in connection with the arrangement of Fig. 3 a combining circuit is preferably some form of adding circuit and consequently produces the algebraic sum of the reference voltage and the voltage from the preceding stage. Depending upon which is the larger, the input voltage to any of the plurality of inverter units 12 may be either positive or negative.

It should also be noted that the reference voltage E from battery 16 represents the maximum codeable signal amplitude and will be chosen of a value equal to the highest input voltage which may be applied to input terminals 11. In the drawing of Fig. 1 the reference voltage applied at each stage, 1 to 4, is labeled and the negative of the absolute value of voltage from the preceding stage is also labeled at the input terminals of each combining circuit 22.

It will be noted that at stages 0 and 1, the sensing device 13 is connected directly to the input of the polarity inverter unit 12 but in the following stages 2, 3 and 4 each sensing device 13 is indirectly connected to the input thru the polarity inverter stage 12. In other words, relative to stages 0 and 1, the inputs of the sensing devices 13 of the following stages have been reversed. This is indicated in Fig. 1 in the labeling of the input voltages to units 13.

Listed below are the decimal numbers 0 to 15 together with their corresponding numbers in cyclic binary code for the purpose of easy reference in following the description of operation.

| Decimal | Cyclic Binary |
|---|---|
| 0 | 00000 |
| 1 | 00001 |
| 2 | 00011 |
| 3 | 00010 |
| 4 | 00110 |
| 5 | 00111 |
| 6 | 00101 |
| 7 | 00100 |
| 8 | 01100 |
| 9 | 01101 |
| 10 | 01111 |
| 11 | 01110 |
| 12 | 01010 |
| 13 | 01011 |
| 14 | 01001 |
| 15 | 01000 |

The theory of operation of Fig. 1 will be made clear by reference to the related drawings, Figs. 2A to 2E. The first drawing, Fig. 2A, represents the cyclic binary code in an arrangement of commutating elements such as might be employed in a reading type encoder for encoding five digits.

Figure 2A:
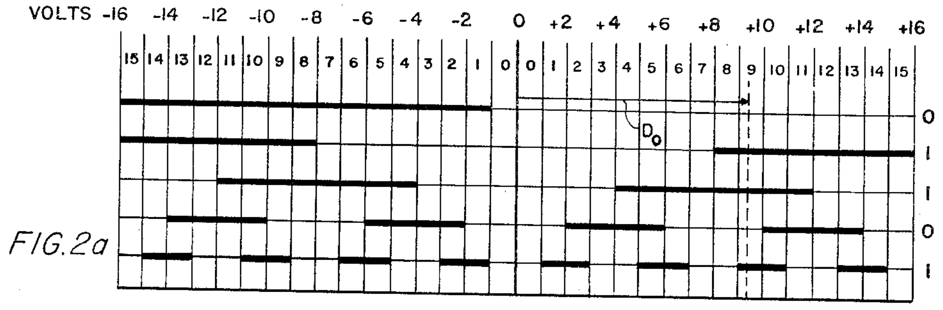
Figure 3:
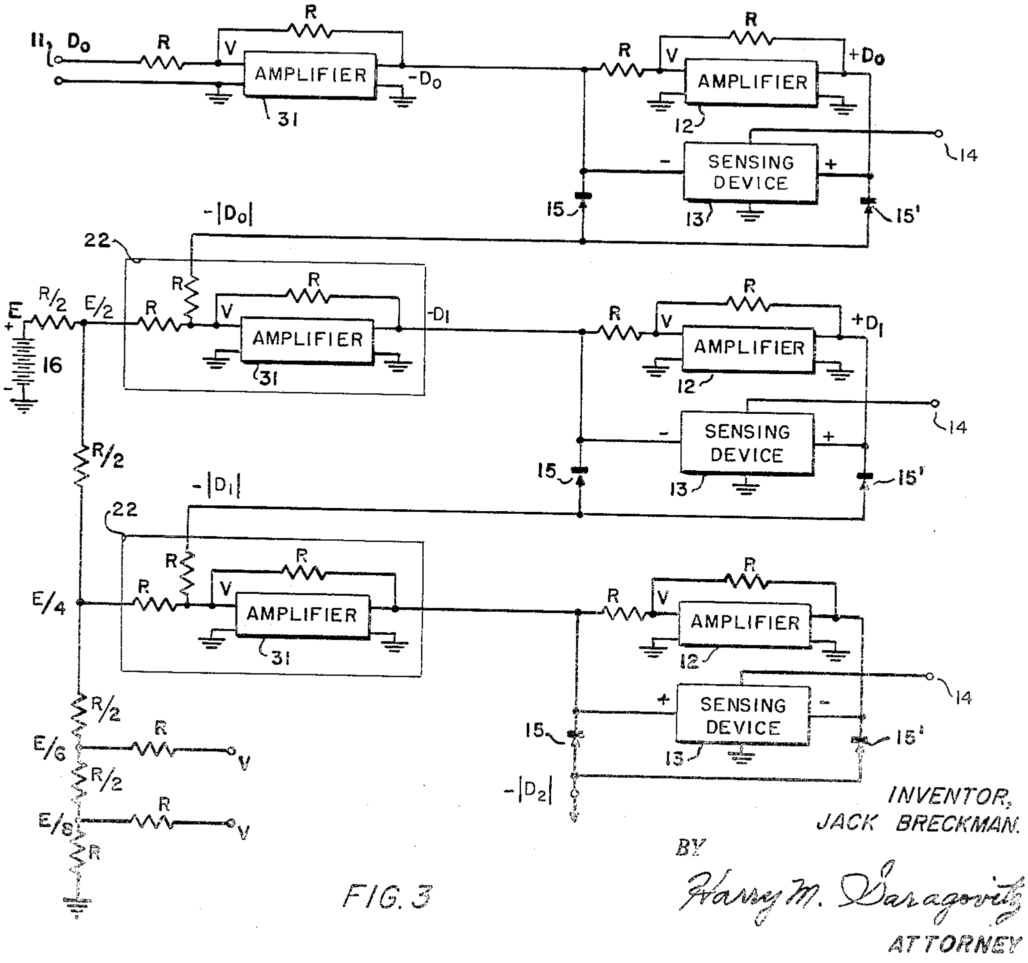

For purposes of illustration the diagram of Fig. 2A has been labeled horizontally to illustrate the case for input signals having maximum values of plus or minus 16 volts. The commutating segments are illustrated in successive rows as black bars, each row corresponding in succession to a less significant digit signal of a five digit code. To illustrate the operation there is indicated by an arrow in the top row an input amplitude $D_0$ which is chosen as positive and of an amplitude of 9.4 volts. Reading vertically as shown by the dotted line, it will be clear that where this line corresponding to plus 9.4 volts crosses a commutating bar a digit signal output of 1 is produced and where no bar is crossed the digit signal output is a 0 as indicated to the right of the diagram. Thus it is evident that the input voltage of plus 9.4 is quantized as the cyclic number 01101 which corresponds to the decimal number 9. Since the circuit of the present invention does not employ a reading or commutating arrangement which would lie along the dotted reading line, the manner of production of the digit signals to be described is a progressive generation of the digit signal outputs beginning with the most significant digit and it will be clear that in each case the organization of the circuit is such that a sensing device produces a 0 for a negative voltage and a 1 for a positive voltage. Thus since the arrow $D_0$ lies to the right in the first row it will be clear that in stage 0 this positive voltage produces an output digit signal which is a 0.

Figure 2B:
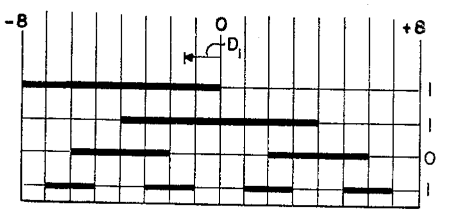

It will be noted that, except for the first row, the commutating elements of the diagram of Fig. 1A are completely symmetrical left and right of zero volts. If now we consider that the diagram of Fig. 2A is folded along the vertical center line corresponding to 0 input voltage so that the right half is turned to register over the left half and if now the upper row is omitted we arrive at the diagram of Fig. 2B. This may be physically achieved by subtracting the absolute value of the input signal from a reference voltage of 8 volts and it will be clear that the result as shown in Fig. 2B is an input of minus 1.4 volts. This subtraction is represented in Fig. 2B by the relabeling of the horizontal part of the diagram as a new range of 0 to plus and minus 8 volts and it will be noted that the difference signal applied to the input of stage 1 is as shown equal to minus 1.4 volts. Since this voltage lies to the left of 0 and over the commutating segment of the top row, it will be clear that we can again determine a digit signal by simply testing for polarity by means of the sensing device 13 of stage 1, and, since the voltage is negative, device 13 will produce a 1 output.

Figure 2C:
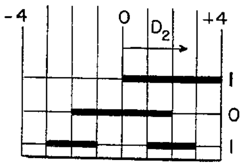

If we proceed now in similar manner by folding Fig. 2B along the center line and again omitting the top segment we arrive at Fig. 2C which now has a horizontal range from 0 to plus and minus 4 volts. Physically this folding corresponds to combining the absolute value of the output of stage 1 with the reference voltage E/4 in the combining circuit 22 of stage 2 to provide a new input $D_2$. In this case the reference voltage of 4 volts minus 1.4 volts from stage 1 produces plus 2.6 volts at stage 2 as shown in the diagram. It will be observed in this case that the difference, which is plus 2.6 volts, lies to the right in the diagram of Fig. 2C but it also is over a commutating segment. This condition is a reversal of the conditions encountered in Fig. 2A and Fig. 2B, and accordingly the sensing device of stage 2 is effectively reversed in the drawing by connecting it to the output of polarity inverter 12 so that for stage 2 the digit signal output becomes a 1.

Figure 2D:
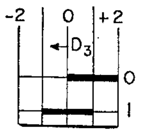
Figure 2E:

Proceeding again to fold the diagram at Fig. 2C and omitting the top commutating bar, we arrive at Fig. 2D. The voltage applied to this stage, stage 3 is $E/8-D_2$ which equals −0.6 volt. Here again as in Fig. 2C the commutating bar lies to the right and accordingly in stage 3 the sensing device 13 is also reversed by connection to the output of inverter 12 and it will be clear that the digit signal output for this stage is a 0. Continuing now to the last stage 4, the residual voltage is +0.4 and since it lies to the right and the commutating bar also lies to the right, the sensing device 12 of stage 4 is again reversed as shown in the drawing and the output becomes a 1.

In general it can be shown for any number of digits that a sensing device 13 will be connected to the input of the stage, for stage 0 and stage 1, but the sensing device will be effectively reversed for all following stages irrespective of the total number. The operation thus far described may be more readily perceived by the following tabulation for the input signal +9.4 volts illustrated in the diagrams of Figs. 2A–2F, where $D_0=9.4$ volts and $E=16$ volts.

| | Input Volts | Input Sense | Digit Output |
|---|---|---|---|
| Stage 0 | +9.4 | + | 0 |
| Stage 1 | 8−9.4=−1.4 | − | 1 |
| Stage 2 | 4−1.4=+2.6 | + | 1 |
| Stage 3 | 2−2.6=−0.6 | − | 0 |
| Stage 4 | 1−0.6=+0.4 | + | 1 |

Cyclic 01101=Decimal 9

More generally the operation may be set forth algebraically as follows.

| | Input | Sense |
|---|---|---|
| Stage 0 | $D_0$ | +=0 |
| Stage 1 | $D_1=E/2-\|D_0\|$ | +=0 |
| Stage 2 | $D_2=E/4-\|D_1\|$ | +=1 |
| Stage 3 | $D_3=E/8-\|D_2\|$ | +=1 |
| Stage 4 | $D_4=E/16-\|D_3\|$ | +=1 |

This rule can be derived mathematically but it is believed that the folding theory here shown, which represents a development of the rule by mathematical induction, is sufficient. It can readily be vertified for any chosen number either positive or negative. To illustrate this fact a second example is given as follows:

[Example of negative number. $D_0=-12.7$ volts.]

| | Input Volts | Input Sense | Digit Output |
|---|---|---|---|
| Stage 0 | −12.7 | − | 1 |
| Stage 1 | 8−12.7=− 4.7 | − | 1 |
| Stage 2 | 4− 4.7=− 0.7 | − | 0 |
| Stage 3 | 2− 0.7=+ 1.3 | + | 1 |
| Stage 4 | 1− 1.3=− 0.3 | − | 0 |

Cyclic 11010=−12

It will be noted from the above example that a negative number when decoded is identical with a positive number except for the most significant digit which becomes a 1. This enables the digit signal to be treated as a negative number. The use of a 1 in the most significant position to indicate polarity is well known in the art and will not be elaborated upon here. Sufficient to say that for arithmetical operations cyclic binary numbers are ordinarily translated into standard binary numbers and in doing so it is common to distinguish positive and negative numbers in the manner referred to. A description of cyclic to standard translators will be found in the copending application of Bernard Lippel, Serial Number 340,415, assigned to the present assignee the Government of the United States.

Referring back to the algebraical representation of the operation of the circuit, a signal amplitude has in general been indicated by a D with a subscript corresponding to the stage and the reference voltage has been indicated as E divided by a power of 2. Accordingly the input amplitude to any stage $r$ can now be defined as $$D_r=E/2^r-|D_{r-1}|$$

Here E is the maximum codeable signal amplitude and $|D_{r-1}|$ is the absolute value of output amplitude of the preceding stage.

The labeling on the drawing of Fig. 1 clearly illustrates this process since for any stage $r$ the input voltage is a reference voltage $E/2^r$ less the absolute value of the input voltage of the preceding stage which is $|D_{r-1}|$. The maximum codeable signal amplitude is E and is determined by the potential of the battery 16.

In general it is to be noted that for any of the stages, 1 to $n$, an input voltage is employed which is the difference between a reference voltage and the absolute value of the output voltage of the preceding stage. It is further to be noted that by this procedure the digit signal corresponding to the stage is derived by simple sensing whether the input voltage to that stage is positive or negative; that is, the digit signal output is produced in accordance with the polarity of input amplitude to the stage and in accordance with the number of the stage. The sensing devices in particular are connected to produce a digit signal output when the input voltage is negative in the case of the initial and first stages and for producing a digit signal output when the input signal is positive for the following stages.

Consider now the circuit shown in Fig. 3 which represents a preferred arrangement of the invention in a practical form which may be employed for encoding input signals as digit signals having a large number of digits. In this drawing the initial stage 0 and stages 1 and 2 have been illustrated and the remaining stages 3 and 4 implied by indicating only the sources of the reference voltages to be applied thereto. Each of the stages 1 and 2 employs for the combining circuit 22 a polarity reversing high gain amplifier 31 having a parallel feed back resistor R. The input potentials are applied to each amplifier input by means of two similar resistors R. This form of combining circuit is well known in the art and is described, for example, in the book entitled "Wave Forms," vol. 19 of Radiation Laboratories Series, McGraw-Hill Book Publishing Company, at page 30 where a complete schematic diagram of such an amplifier is shown as Fig. 2.12A, and at pages 644 and 645 where the operation and theory is explained with the aid of diagram, Fig. 18.15. This type of adding or combining circuit may be briefly summarized by noting that the amplifier portion indicated by the block 31 is ordinarily a high gain amplifier and that any voltage applied at one of the input terminals through a resistance R (which equals the feed back resistor R) will produce at the output of the amplifier substantially the same amplitude of voltage as applied to the input but in opposite polarity. An interesting feature of such an amplifier is that the input terminal to the amplifier, per se, is essentially at ground potential. This input point may be referred to as a virtual ground and is so indicated in the drawing by the labeling of these input points with a V. The virtual ground will be understood if reference is made to the similar amplifier employed at the input in stage 0 of Fig. 3. This amplifier is employed for purposes of symmetry in the circuit organization and it will be clear from the labeling that the input potential at terminals 11 is the voltage $D_0$ while the voltage at the output is $-D_0$. It will be noted that the input resistor R and the feed back resistor R connect between these two equal and opposite voltages and it will be evident, by simple application of Ohm's law, that the point V must therefore be at zero or ground potential. Actually, of course, there must be some input voltage to the amplifier at this point so, as in all feed back circuits, the point V approaches but never truly reaches ground potential.

The fact that the point V of the combining circuits 22 of stages 1 to $n$ are effectively at ground potential is utilized to provide a simple and effective form of dividing network for supplying precise reference potentials. This preferred form is illustrated in the schematic drawing, Fig. 4, where a source of voltage E is effectively divided in the desired ratios indicated on the drawing by employing a series parallel network of resistances in which the series elements, except the last one, all have values R/2 and the parallel elements all have values R. Referring back to the dividing network for the voltage source 16 in Fig. 3, it will be noted that the resistors for each stage, except that at the bottom of the drawing, each have values R/2 and the parallel branches corresponding to those of Fig. 4 are comprised of the resistors R which form a part of each combining circuit 22. Therefore the virtual grounds V in each of the combining circuit 22 serve to form a network in Fig. 3 which is essentially of the form shown in Fig. 4. It will further be noted that each absolute value circuit employs a reversing amplifier of the preferred form, namely a high gain amplifying unit having a parallel feed back resistor R and an input resistor R so that a second accurate reversal of input amplitude is accomplished. The rectifier 15 and 15' are connected as in Fig. 1. However the sensing devices 13 are, in this preferred arrangement, connected between output and input of the reversing amplifier since by this expedient double the sensitivity can be obtained.

In Fig. 1 a simple form of sensing device comprising a voltmeter arranged to operate as a switch was illustrated but it will be understood that other arrangements may be employed and certain of them may be preferable. For example, the sensing devices 13 of Fig. 3 may be bistable mutivibrator units of the electronic type now very well known in the art. For one polarity of input there will be one condition of stability for the multivibrator to produce an output which may be interpreted as a 0 and for the opposite polarity of input to the circuit an opposite condition of stability will be produced and a level of output will be produced which will be interpreted as a 1 output. The sensing devices 13 are, therefore, sense responsive generator circuits for producing digit signal outputs in accordance with the polarity of input signal to a stage. It will be noted here that the units 13 of stages 0 and 1 are connected as indicated by the signs minus and plus at the input terminals but for stage 3 (and this condition obtains for all following stages) the connections are reversed as indicated by the plus and minus signs at the input.

It is to be noted in connection with both Fig. 3 and Fig. 1 that there are no control circuits from any one stage back to a preceding stage so that each stage is an independent self-contained operating unit for producing a digit signal output in accordance with the polarity of input voltage thereto and the number of the stage in the series and to transmit to the following stage a voltage of negative plurality which is equal in magnitude to an input voltage of the stage. Thus in either of the two embodiments of the invention illustrated there are no switching operations as in prior art arrangements and there are no comparison testing operations which must be performed.

It is not necessary in the instant invention for one operation to be completed before the next operation is commenced. From what has thus far been stated it may seem that on the application of an input voltage $D_0$ all of the digit signal outputs from the several stages are simultaneously produced. This, however, is not strictly true because of a finite settling time or band-width requirement of the system. Because of inherent distributed capacities and inductances in the circuit the speed of operation is limited as in all electronic devices. Accordingly the circuit as illustrated in Fig. 3 has been particularly designed to minimize delay by employing the elements described and thereby to make the operation effective in a minimum of time of, say, the order of a few microseconds.

While there has been described what is at present considered to be a preferred embodiment of this invention, it will be obvious to those skilled in the art that various changes and modifications may be made therein without departing from the spirit of the invention, and it is, therefore, aimed in the appended claims to cover all such changes and modifications as fall within the true spirit and scope of the invention.

What is claimed is:

1. A circuit for encoding a signal amplitude as a code group of digit signals in cyclic binary code comprising an initial stage and a plurality of following stages, $l$ to $n$, which in order correspond to decreasingly significant digits of the group, each of said stages, except the $n$th stage, comprising an absolute value circuit having means for receiving an input amplitude and producing an output of equal amplitude in a chosen polarity; a source of reference amplitudes; means for applying said signal amplitude to said initial stage, means for applying to each stage, $l$ to $n$, the difference between a reference amplitude and the absolute value of the output amplitude of the preceding stage, said reference amplitudes having values such that the reference amplitude for any stage, $r$, is $E/2^r$, where E is the maximum codeable signal amplitude; a sensing circuit for each stage and means for coupling each sensing circuit to its stage to produce a digit signal output in accordance with the polarity of input amplitude to said stage.

2. A circuit for encoding a signal amplitude as a code group of digit signals in cyclic binary code comprising an initial stage and a plurality of following stages, $l$ to $n$, which in order correspond to decreasingly significant digits of the group, each of said stages, except the $n$th stage, comprising an absolute value circuit having means for receiving an input amplitude and producing an output of equal amplitude in a chosen polarity; a source of reference amplitudes; means for applying said signal amplitude to said initial stage, means for applying to each stage, $l$ to $n$, the difference between a reference amplitude and the absolute value of the output amplitude of the preceding stage, said reference amplitudes having values such that the input amplitude to any stage, $r$, is $D_r$ as defined by the equation $D_r=/2^r-|D_{r-1}|$, where E is the maximum codeable signal amplitude and $|D_{r-1}|$ is the absolute value of output amplitude of the preceding stage; a sensing circuit for each stage and means for coupling each sensing circuit to its stage to produce a digit signal output in accordance with the polarity of input amplitude to said stage.

3. A circuit for encoding an electrical signal voltage as a code group of digit signals in cyclic binary code comprising an initial stage and a plurality of following stages, $l$ to $n$, which in order correspond to decreasingly significant digits of the group, each of said stages, except the $n$th stage, comprising an absolute value circuit having means for receiving an input voltage and producing an output of equal voltage in a chosen polarity; a source of reference voltages; means for applying said signal voltage to said initial stage, means for applying to each stage, $l$ to $n$, the difference between a reference voltage and the absolute value of the output voltage of the preceding stage, said reference voltages having values such that the input voltage to any stage, $r$, is $D_r$ as defined by the equation $D_r=E/2^r-|D_{r-1}|$, where E is the maximum codeable signal voltage and $|D_{r-1}|$ is the absolute value of output voltage of the preceding stage; a sense responsive generator circuit for each stage and means for coupling each sense circuit to its stage to generate a digit signal output in accordance with the polarity of input voltage to said stage and the number of the stage.

4. A circuit for encoding an electrical signal voltage as a code group of digit signals in cyclic binary code comprising an initial stage and a plurality of following stages, $l$ to $n$, which in order correspond to decreasingly significant digits of the group, each of said stages, except the $n$th stage, comprising an absolute value circuit for receiving an input voltage and producing an output of equal voltage in a chosen polarity, each said absolute value circuit comprising a polarity inverting circuit and means coupled to both the input and output for selecting said chosen polarity of voltage; a source of reference voltages; means for applying said signal voltage to said initial stage, means for applying to each stage, $l$ to $n$, the difference between a reference voltage and the absolute value of the output voltage of the preceding stage, said reference voltages having values such that the input voltage to any stage, $r$, is $D_r$ as defined by the equation $$D_r=E/2^r-|D_{r-1}|$$

where E is the maximum codeable signal voltage and $|D_{r-1}|$ is the absolute value of output voltage of the preceding stage; a sense responsive generator circuit for each stage and means for coupling each sense circuit to its stage to generate a digit signal output in accordance with the polarity of input voltage to said stage, said means for coupling comprising circuit connections for producing a response in one sense to the input polarities of said initial and first stages and a response in the opposite sense to the input polarities of the following stages.

5. A circuit for encoding an electrical signal voltage as a code group of digit signals in cyclic binary code comprising an initial stage and a plurality of following stages, $l$ to $n$, which in order correspond to decreasingly significant digits of the group, each of said stages, except the $n$th stage, comprising an absolute value circuit having means for receiving an input voltage and producing an output of equal voltage in negative polarity; a source of reference positive voltages; means for applying said signal voltage to said initial stage, means for applying to each stage, $l$ to $n$, the algebraic sum of a reference positive voltage and the negative output voltage of the preceding stage, said reference positive voltages having values such that the input amplitude to any stage, $r$, is $D_r$ as defined by the equation $D_r=E/2^r-|D_{r-1}|$, where E is the maximum codeable signal voltage and $|D_{r-1}|$ is the absolute value of output voltage of the preceding stage; a sense responsive generator circuit for each stage and means for coupling each sense circuit to its stage to generate a digit signal output in accordance with the polarity of input amplitude to said stage, said means for coupling comprising circuit connections for producing digit signal outputs for negative input voltages to said initial and first stages and digit signal outputs for positive input voltages to the remaining stages.

6. A circuit for encoding a signal amplitude as a code group of digit signals in cyclic binary code, wherein the most significant digit is indicative of polarity and the remaining digits are indicative of magnitude, comprising an initial stage and a plurality of following stages, said initial stage corresponding to the most significant digit and said following stages, $l$ to $n$, in order corresponding to decreasingly significant digits of the group, each of said stages, except the $n$th stage, comprising an absolute value circuit having means for receiving an input amplitude and producing an output of equal amplitude in a chosen polarity; a source of reference amplitudes; means for applying said signal amplitude to said initial stage, means for applying to each stage, $l$ to $n$, the difference between a reference amplitude and the absolute value of the output amplitude of the preceding stage, said reference amplitudes having values such that the input amplitude to any stage, $r$, is $D_r$ as defined by the equation $$D_r=E/2^r-|D_{r-1}|$$

where E is the maximum codeable signal amplitude and $|D_{r-1}|$ is the absolute value of output amplitude of the preceding stage; a sensing circuit for each stage and means for coupling each sensing circuit to its stage to produce a digit signal output in accordance with the polarity of input amplitude to said stage.

7. A circuit for encoding an electrical signal voltage as a code group of digit signals in cyclic binary code comprising an initial stage and a plurality of following stages, $l$ to $n$, which in order correspond to decreasingly significant digits of the group, each of said stages, except the $n$th stage, comprising an absolute value circuit having means for receiving an input voltage and producing an output of equal voltage in a chosen polarity; a source of reference voltages; means for applying said signal voltage to said initial stage, means comprising a combining circuit for applying to each stage, $l$ to $n$, the difference between a reference voltage and the absolute value of the output voltage of the preceding stage, each said combining circuit comprising a feed back summing amplifier having input impedance elements, said elements having values chosen to provide a virtual ground at the input of said feed back amplifier, said reference voltages having values determined by an impedance network having series and parallel impedance elements, each said parallel element comprising a one of said input impedance elements, to provide an input voltage to any stage, $r$, which is $D_r$ as defined by the equation $D_r=E/2^r-|D_{r-1}|$, where E is the maximum codeable signal voltage and $|D_{r-1}|$ is the absolute value of output voltage of the preceding stage; a sense responsive generator circuit for each stage and means for coupling each sense circuit to its stage to generate a digit signal output in accordance with the polarity of input voltage to said stage and the number of the stage.

References Cited in the file of this patent

UNITED STATES PATENTS 2,570,221 Earp et al. .............. Oct. 9, 1951